United States Patent
Schau et al.

[19]

[11] Patent Number: 6,094,299
[45] Date of Patent: Jul. 25, 2000

[54] DEVICE FOR SWITCHING AND FOCUSING MICROSCOPE OBJECTIVES

[75] Inventors: Dieter Schau, Nerkewitz; Hans Brinkmann, Goettingen; Peter Dietrich, Oberkochen, all of Germany

[73] Assignee: Carl Zeiss Jena GmbH, Jena, Germany

[21] Appl. No.: 09/168,506

[22] Filed: Oct. 8, 1998

[30] Foreign Application Priority Data

May 22, 1998 [DE] Germany .............................. 198 22 870

[51] Int. Cl.[7] ...................................................... G02B 21/00
[52] U.S. Cl. ........................... 359/383; 359/368; 359/380; 359/381; 359/821
[58] Field of Search ...................................... 359/379, 380, 359/381, 382, 821, 368, 383

[56] References Cited

U.S. PATENT DOCUMENTS 1,818,974  8/1931  Engelmann .............................. 359/821
3,565,512  2/1971  Peck ......................................... 359/381

*Primary Examiner*—Cassandra Spyrou
*Assistant Examiner*—Leo Boutsikaris
*Attorney, Agent, or Firm*—McAulay Nissen Goldberg Kiel & Hand, LLP

[57] ABSTRACT

In a microscope such as for the examination of specimens in specimen vessels, a device for changing objectives is provided. The microscope includes at least a first objective. The device comprises an arrangement for providing an operating control so that the at least first objective can be raised and lowered vertically and is displaceable horizontally vertical to an optical axis of the microscope.

5 Claims, 4 Drawing Sheets

DEVICE FOR SWITCHING AND FOCUSING MICROSCOPE OBJECTIVES

BACKGROUND OF THE INVENTION a). Field of the Invention

The invention relates to the focusing of microscope objectives and, in particular, a device for switching and focusing microscope objectives.

b). Description of the Related Art

Conventional microscopes which operate on the principle of focusing the objective turret instead of the microscope stage are often used for micromanipulation of the specimen (patch clamp technique) and for electrophysiological measurements. The specimen is held in various vessels for this purpose. These vessels are often Petri dishes with projecting edges. The specimen is placed in aqueous solution.

As a rule, two objectives are sufficient for searching and observation. Problems occur when changing the specimen vessel, when displacing the microscope stage and when switching the objective into the work position. The circular arc-shaped movement of the objectives when switching a conventional objective turret can result in contact with the highly sensitive manipulators. It is possible under some circumstances for the objective to strike the edge of the Petri dish, which causes the specimen to be moved at least in its x,y position. During the usual diagonal deflection of the objective (switching to the next objective), the liquid is moved in the horizontal direction, which can also result in the problem described above.

OBJECT AND SUMMARY OF THE INVENTION

It is the primary object of the invention to eliminate these disadvantages. This object is met by a device for changing objectives in a microscope such as for the examination of specimens in specimen vessels. The microscope includes at least a first objective. The device comprises means for providing an operating control so that the at least first objective can be raised and lowered vertically and is displaceable horizontally vertical to an optical axis of the microscope. The special advantages of the invention consist in that the objective can be guided up vertically and swiveled away when changing objectives, so that operating controls, as the case may be, can remain in position. This is especially important when specimens are in aqueous solution, wherein the objective can project partially into the Petri dish and lateral micromanipulators and microelectrodes are provided.

As a result of the invention, a position can be advantageously realized with two objectives in which both objectives are removed from the work position. It is also possible in an advantageous manner to dispense with stage displacement during focussing, changing of objectives and changing of specimens, which makes the changing device, according to the invention, particularly attractive in the case of heavy stages which are stable relative to vibration and can also be separated from the microscope stand. Another advantage of the invention consists in that the operating control has a dual function: the displacing movement for changing objectives and the rotating movement for raising and lowering the objective. Accordingly, only one handle is required for both functions.

The objective can be moved carefully into the aqueous solution due to the special design of the handle as a swiveling lever and the adjusting mechanism of the changing device. Accordingly, troublesome movement of the liquid can be kept to a minimum. Further, the orientation of the swivel lever indicates the switching state of the changing device.

It is also advantageous that displacement and rotation of the operating control are not possible simultaneously due to a lock in the mechanism. Accordingly, the user is given the assurance of being in only one defined, noncritical state.

The invention will be described more fully hereinafter with reference to the schematic drawings.

The following elements with their reference numbers are shown in the drawing:

M microscope
O eyepiece
K control knob for changing objective
OH1, OH2 objective holder
O1, O2 objectives
T1 stage
B illumination
FK focusing knob
PS Petri dish
T stationary carrier
S carriage
SS carriage guide rods
SZS control rod
VF vertical guide
L1, L2, L3 bearings
RF catch spring
RP catch points
AL1, AL2 supports
H rotating lever
HN lever projection
NT groove
NL groove strip
NLE end of groove strip
MN driver

Figure 1:
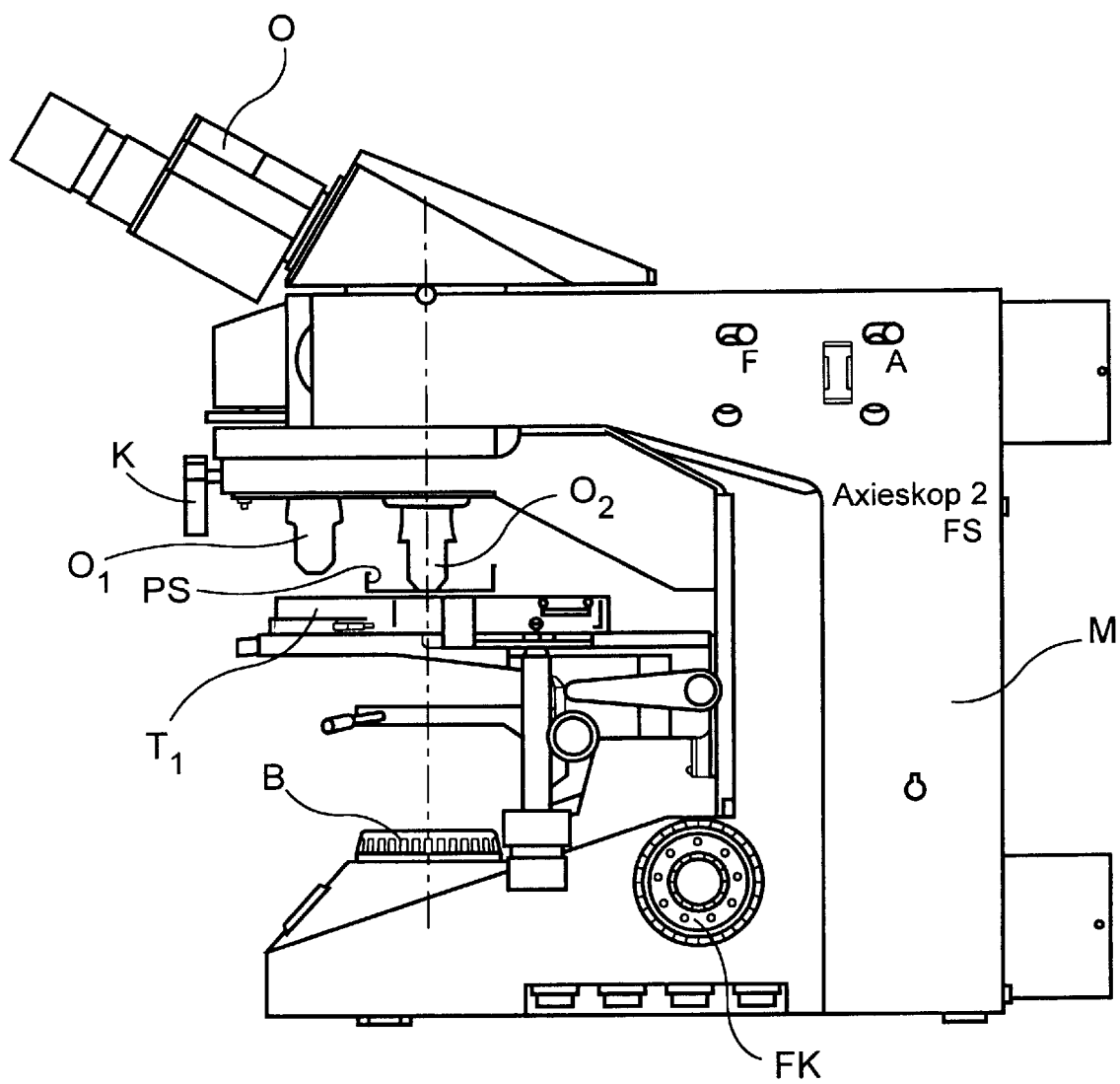
FIG. 1 shows a microscope in accordance with the present invention.

The focusing microscope M under consideration is shown in FIG. 1 and comprises a stand, an eyepiece O, a specimen stage T1 with Petri dish PS, illumination B and a focusing knob FK for focusing the objectives. Two objectives, O1 and O2, are shown which can be exchanged via a control knob, wherein O2 is located in the optical axis of the microscope.

DESCRIPTION OF THE PREFERRED EMBODIMENTS

Figure 2:
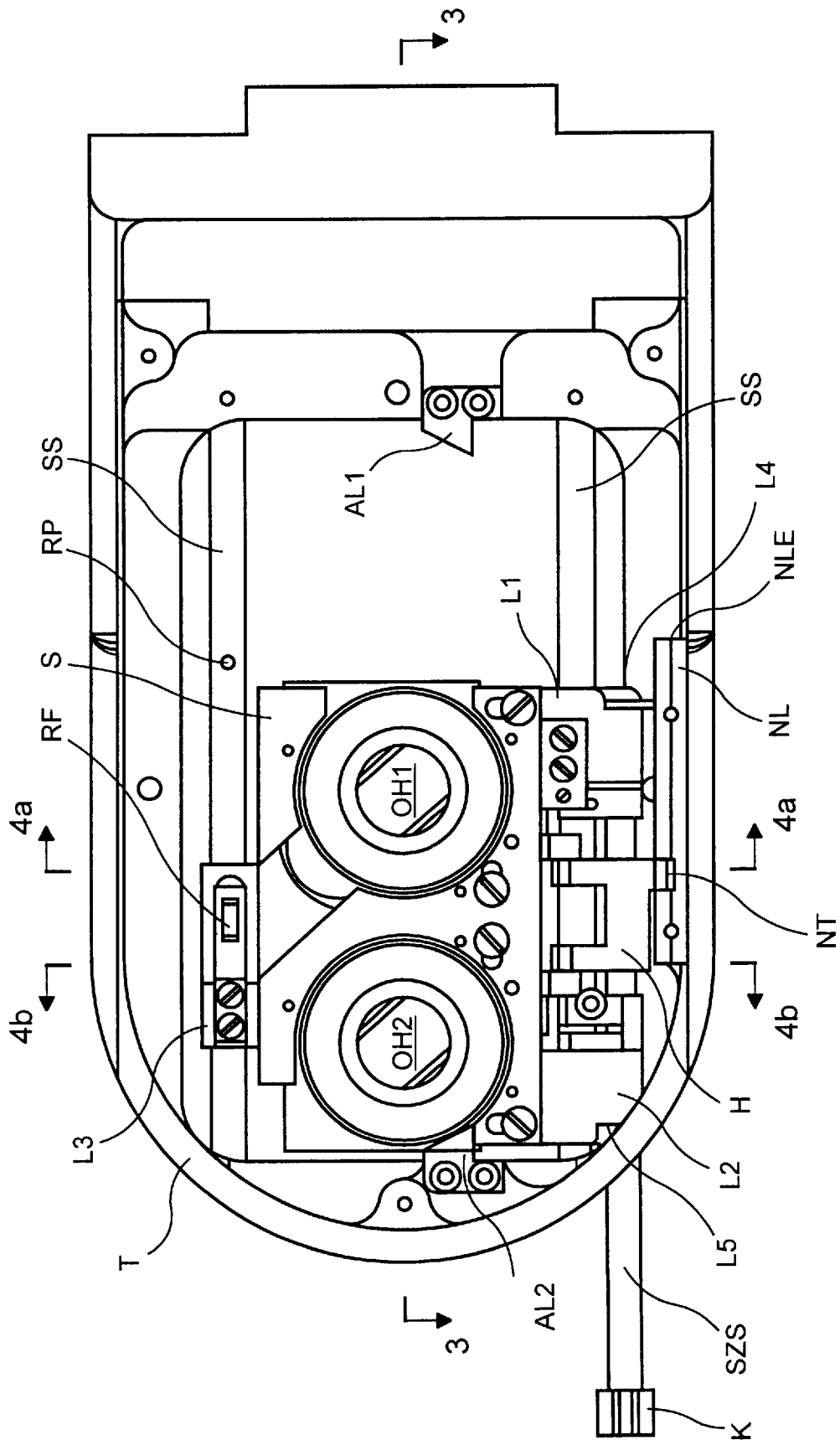
FIG. 2 shows a view of the objective changing unit viewed from below.
Figure 3:
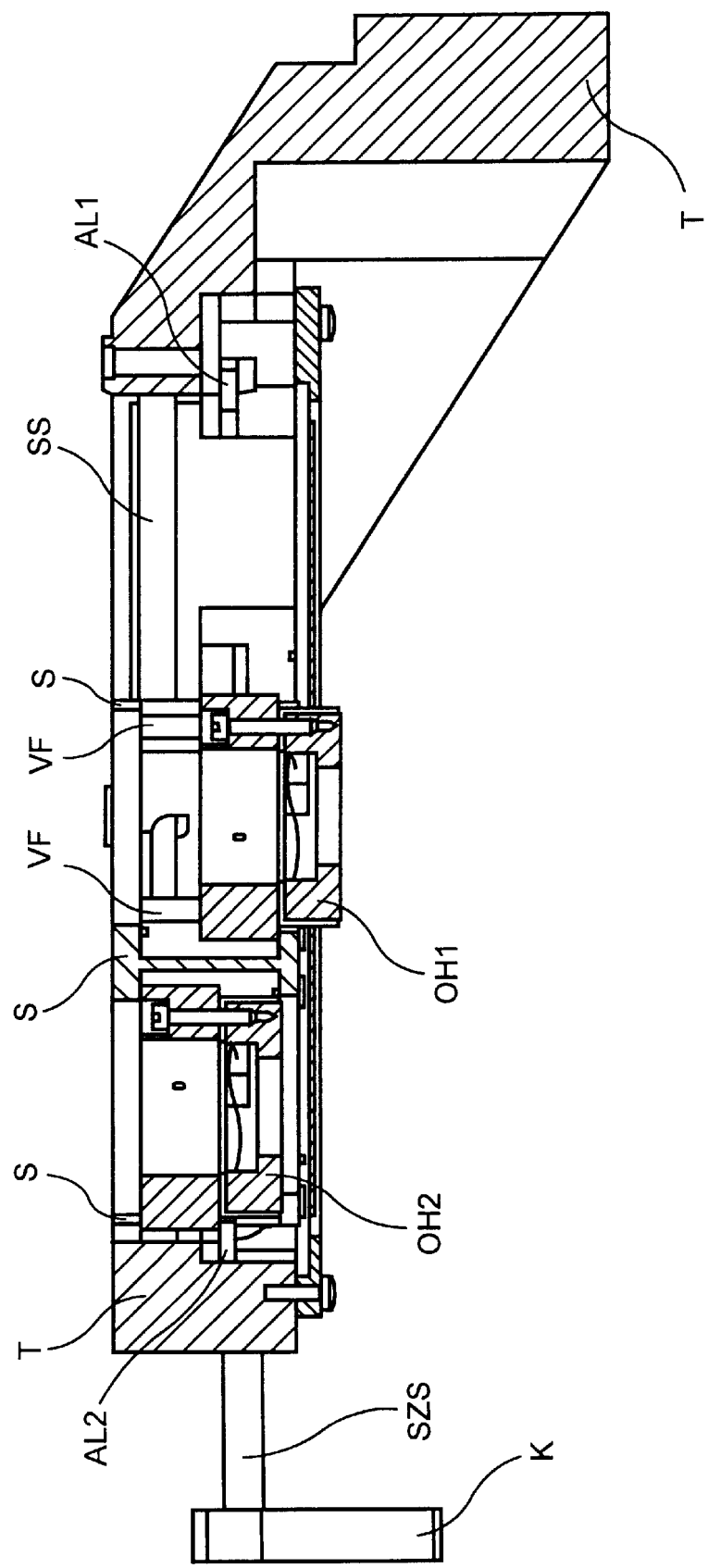
FIG. 3 shows a side view along line B—B in FIG. 2.

Referring to FIGS. 2 and 3, objective holders OH1, OH2 are provided for receiving objectives O1, O2, not shown, which are displaceable for this purpose at vertical guides VF.

The vertical guides are a component part of a carriage S which is mounted on carriage rods SS connected with the stationary carrier T via bearings L1, L2, L3 so as to be horizontally displaceable.

Further, a catch spring RF is provided at the bearing L3 which catches at corresponding catch points RP of one rod SS. A rod SZS with a control knob K is connected with the carriage S and with a lever H which will be discussed more fully.

The rod SZS is articulated at the carriage S via bearings L4, L5 in such a way that it acts as a tension rod for the carriage, but can execute a rotating movement at the same time for actuating the lever H.

Also shown in FIG. 2 are supports AL1, AL2 which are fastened to the carrier; their function will also be discussed below.

FIG. 3 shows that objective holder OH1 is located in the optical axis of the microscope, while objective holder OH2 is in an idle position. For this purpose, it is in an upper position in which the vertically displaceable objective holder OH2 is prevented from being lowered by the support AL2.

On the other hand, the holder OH1 is located in a lower position and is not influenced by the support adjacent to it. The raising and lowering of the objective holders OH1, 2 and the horizontal displacement of the carriage S will now be described more fully, especially with reference to FIGS. 4a and b.

Figure 4A:
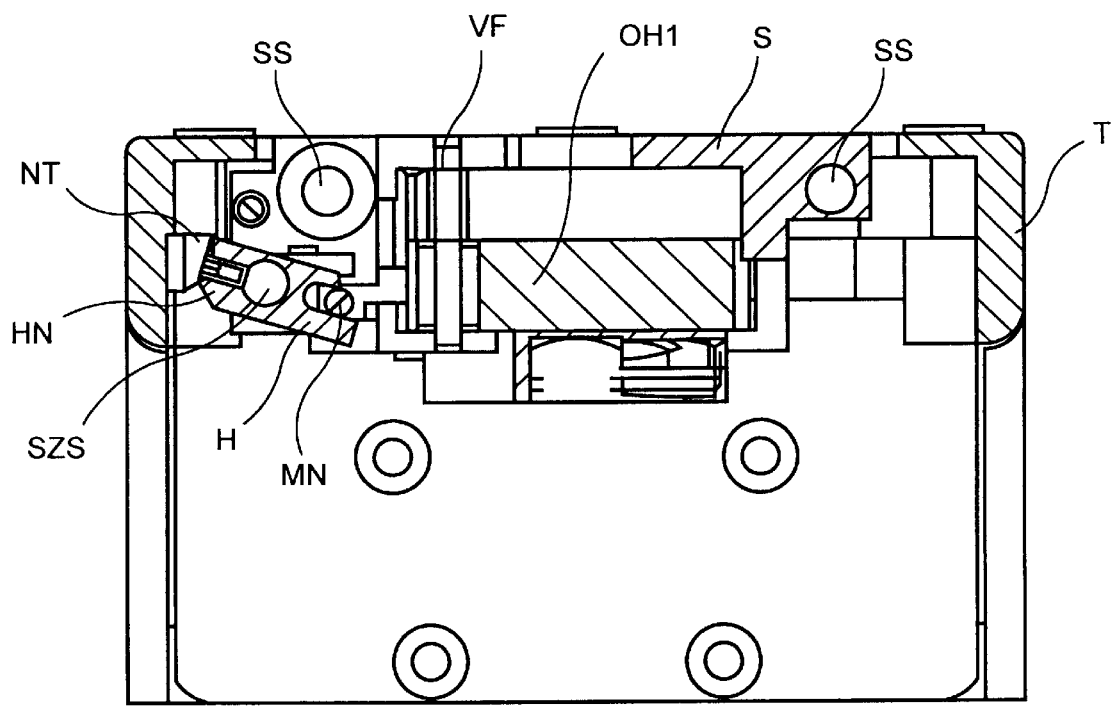
FIG. 4a shows a lateral section vertical to FIG. 2 along line A1—A1.
Figure 4B:
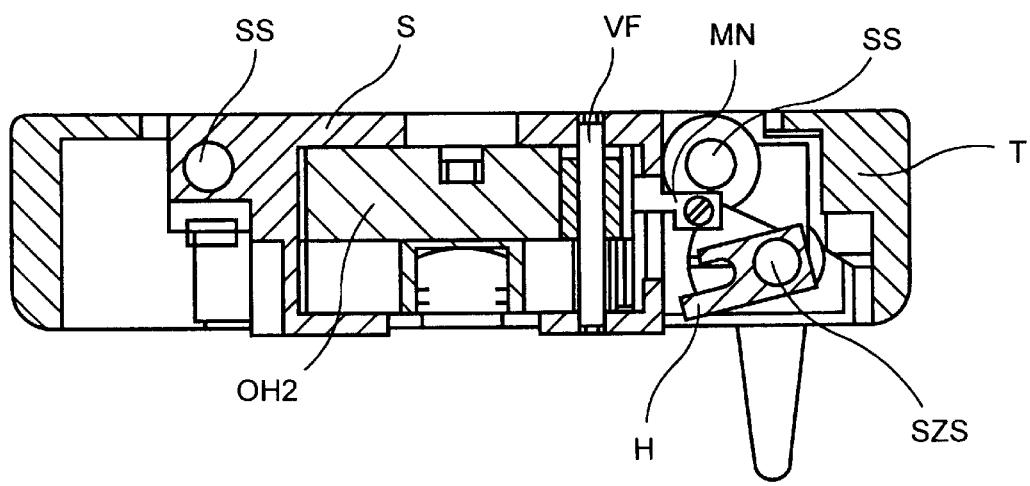
FIG. 4b shows a second lateral section along line A2—A2.

The lever H shown in FIG. 2 is rotatable via the rod SZS and can be rotated by the user between an upper and a lower position. In FIG. 4a, it is located in a lower position and is engaged with an objective holder via a driver MN. The lever has a clawlike shape, wherein the upper claw part is constructed so as to be shorter than the lower claw part.

As can easily be seen in FIG. 4a, the objective holder can be raised vertically by guiding it over the vertical guide VF by means of the lever H and driver MN. The lever H has a projection HN which engages in a groove NT at the carrier T in the lowered position. When OH is raised via the rod SZS and lever H, the projection HN is lifted out of the groove, so that the carriage S is displaceable horizontally on its guides SS with both objective holders OH1,2 via rod SZS, wherein lever H slides in a groove strip NL.

At the same time, one objective holder OH1 is lifted out of its lower position and the other objective holder which was located in an upper position on a support AF2 is likewise easily lifted and displaceable. A displacement of the carriage S can now be carried out in such a way that the other objective holder is brought into alignment with the optical axis. When the lever H is lowered again by the rotation of the SZS, the objective holder OH1 contacts the other support AF1 in an upper position. This is achieved by means of the above-mentioned construction of the lever claw of the lever H whose upper part is smaller than the lower part, so that it does not catch on the respective driver.

On the other hand, the other objective holder OH2 does not become caught at a support and is lowered into a work position. This position is reproducible because H locks behind the end NLE of the groove strip NL.

When the lever H is raised again, it carries along the lower objective holder OH2 via its driver MN, and its lower larger claw end reaches the upper objective holder and lifts it easily from the support, so that the two objective holders are freely displaceable into the other position. When only one objective holder is used, the construction described above can be used in a similar manner.

The lever then engages only in the driver of one objective holder and a support is provided for holding this objective holder in an upper position in order to be able to search the specimen in a specimen vessel without hindrance.

While the foregoing description and drawings represent the present invention, it will be obvious to those skilled in the art that various changes may be made therein without departing from the true spirit and scope of the present invention.

What is claimed is:

1. In a microscope for the examination of specimens in specimen vessels, a device for changing objectives, said microscope including at least a final objective, said device comprising means for providing an operating control so that said at least first objective is raised and lowered vertically and is displaceable horizontally perpendicular to an optical axis of the microscope, and wherein said means includes a connecting rod as operating control, wherein the raising and lowering of said at least first objective is brought about by rotating said rod and the displacement of the objective is carried out by displacing the rod.

2. The device according to claim 1, wherein said means includes a connecting rod as operating control, wherein the raising and lowering of said at least first objective is brought about by rotating said rod and the displacement of the objective is carried out by displacing the rod.

3. The device according to claim 1, wherein said at least first objective is mounted so as to be displaceable vertically in objective holders on a shared guide which is displaceable horizontally by said rod.

4. The device according to claim 1, wherein said at least first objective is raised via lever which is fastened to the rod.

5. The device according to claim 4, wherein the lever is constructed in a clawlike manner and engages in drivers which are provided at the objective holders.

* * * * *